US008620609B2

(12) United States Patent
Lakshminarayan et al.

(10) Patent No.: US 8,620,609 B2
(45) Date of Patent: Dec. 31, 2013

(54) METHOD AND APPARATUS FOR IDENTIFYING ANOMALIES OF A SIGNAL

(75) Inventors: Choudur Lakshminarayan, Austin, TX (US); Krishnamurthy Viswanathan, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 254 days.

(21) Appl. No.: 12/900,307

(22) Filed: Oct. 7, 2010

(65) Prior Publication Data
US 2012/0089357 A1 Apr. 12, 2012

(51) Int. Cl.
*G06F 19/00* (2011.01)
*G06F 17/18* (2006.01)

(52) U.S. Cl.
USPC ............................................ 702/66; 702/179

(58) Field of Classification Search
USPC ........................................ 702/66, 75, 77, 179
See application file for complete search history.

(56) References Cited

U.S. PATENT DOCUMENTS

| | | | | |
|---|---|---|---|---|
| 5,884,245 A | * | 3/1999 | Chandler | 702/189 |
| 2005/0197590 A1 | * | 9/2005 | Osorio et al. | 600/544 |
| 2007/0179363 A1 | * | 8/2007 | Stupp et al. | 600/301 |
| 2010/0002929 A1 | * | 1/2010 | Sammak et al. | 382/133 |

* cited by examiner

*Primary Examiner* — Bryan Bui

(57) ABSTRACT

A method and apparatus are disclosed for identifying anomalies of a signal, by analyzing a signal using a frequency-based technique, analyzing results of the frequency-based analysis using a statistical analysis technique, determining one or more limits based on the statistical analysis, and comparing a frequency domain representation of the signal to the limits to identify anomalies of the signal.

20 Claims, 3 Drawing Sheets

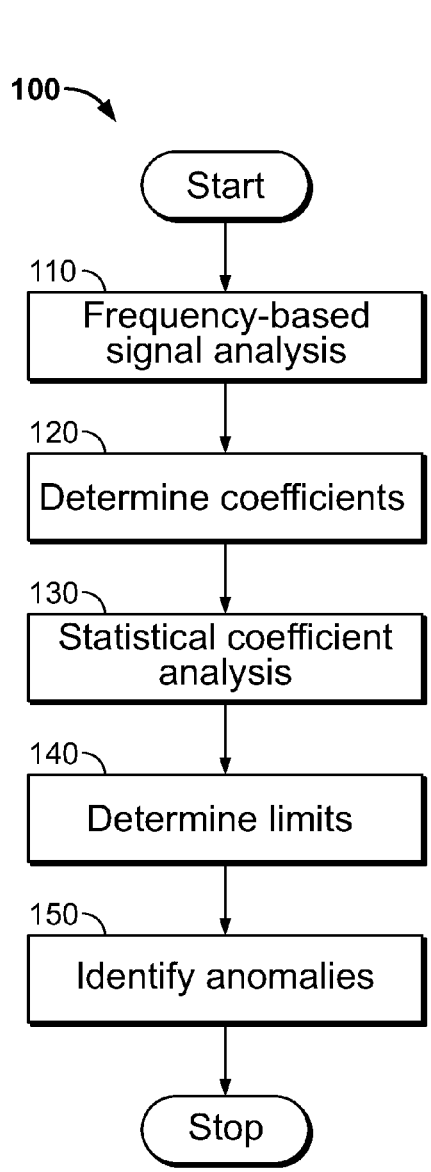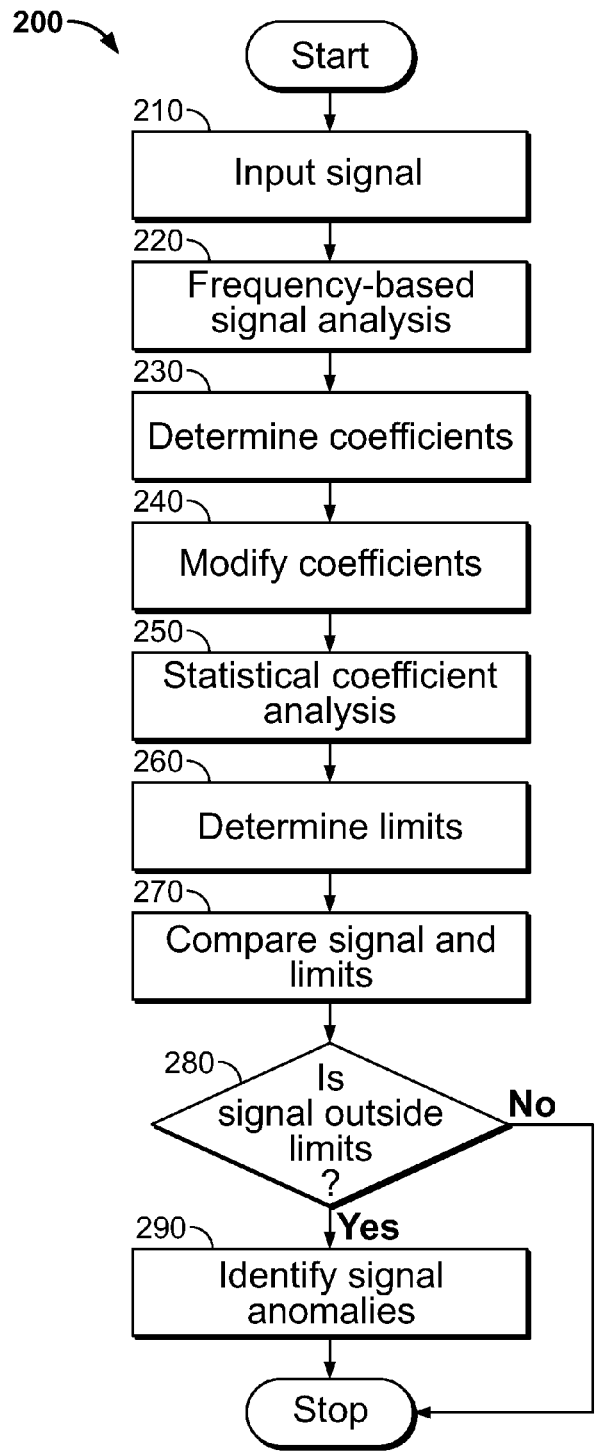
FIG. 1
FIG. 2

METHOD AND APPARATUS FOR IDENTIFYING ANOMALIES OF A SIGNAL

BACKGROUND

Time series data in the time domain may be transformed into the frequency domain by application of a fast Fourier transform, Gabor transform, or similar method. A signal representation in a frequency domain may be a set of coefficients that may measure a correlation between data and sinusoids/co-sinusoids that may be oscillating at a plurality of frequencies versus a number of discrete samples. Squares of coefficients as functions of frequencies are known as a periodogram and/or a spectrogram.

BRIEF DESCRIPTION OF THE DRAWINGS

FIG. 1 is a flowchart illustrating operation of a method according to embodiments of the invention;

FIG. 2 is a flowchart illustrating operation of another method according to embodiments of the invention;

Figure 3:
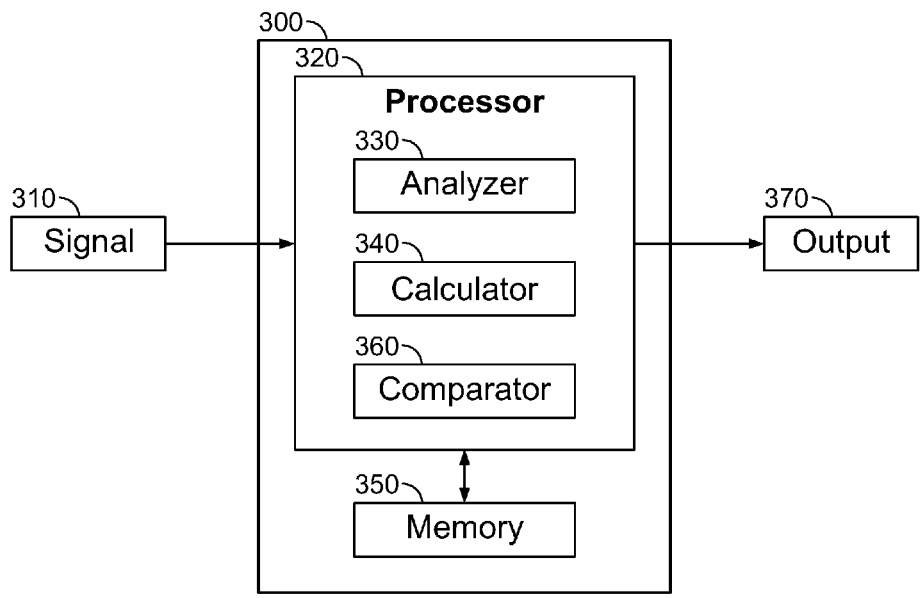
FIG. 3 is a conceptual block diagram according to embodiments of the invention.

Where considered appropriate, reference numerals may be repeated among the drawings to indicate corresponding or analogous elements. Moreover, some of the blocks depicted in the drawings may be combined into a single function.

DETAILED DESCRIPTION

In the following detailed description, numerous specific details are set forth in order to provide a thorough understanding of embodiments of the invention. However, it will be understood by those of ordinary skill in the art that the embodiments of the present invention may be practiced without these specific details. In other instances, well-known methods, procedures, components, and circuits have not been described in detail so as not to obscure the present invention.

A frequency analysis of a signal via popular periodograms may not detect signal anomalies that may be automatically based on a threshold. These anomalies, which may be discontinuities or spikes in the signal, may be represented as "blips" in a periodogram plot. It would be useful to be able to better detect such discontinuities.

Embodiments of the present invention, which may be used in a variety of applications, provide methods for automatically detecting signal anomalies. Although the present invention is not limited in this respect, the techniques disclosed herein may be used in signal analysis, spectral estimation, anomaly detection and related applications. The techniques disclosed herein may further be used for streaming signal analysis, real-time signal analysis and near-real-time signal analysis. A computing device may implement the techniques described herein, and device settings or procedures may be altered based on results of such techniques.

An embodiment may assume data, for example x(t), may be a function of a linear combination of curves, for example sinusoidal representations, that may be summed with an additional term or terms. Such an additional term or terms may be represented as a function, for example, a function that may be in a Gaussian form, and such term may be representative of a process, e.g., noise. This combination may be referred to as a linear combination of sinusoids and a Gaussian error. A fast Fourier transform (FFT) may be applied to a function, e.g., x(t). A result of such transform may be a set of coefficients, and such a set of coefficients may be Gaussian in nature. A set of Gaussian coefficients may be used for other processes, for example detection, or outlier detection. A square function applied to Gaussian results may further result in other variates, for example chi-square variates, and may be a set of squares of coefficients.

A periodogram may describe a frequency versus a square of coefficients. Such a periodogram may be descriptive of physical properties, e.g., an energy and/or a power spectrum. Squares of coefficients may be analyzed by a statistical distribution, e.g., a chi-square distribution. A statistical distribution may have associated confidence limits, e.g., $100*(1-\alpha)$ percent confidence limits, and such limits may be derived from a statistical distribution. For example, for alpha equal to 1%, 5% and 10%, a 99%, a 95% and a 90% confidence limit may be found, respectively. Any energy or power, e.g., spectral energy or spectral power, that may be outside a confidence limit may be designated, or flagged, as an "anomaly." Anomalies that may be so designated may be stored and may be compared to an original signal for identification or other analysis purposes.

Squares of coefficients may be analyzed by other methods to establish limits for identifying anomalies. A non-parametric procedure, for example, may be used. $25^{th}$ (Q1), $50^{th}$ (Q2) and $75^{th}$ (Q3) quantiles may be computed from a distribution of squares of coefficients. Such quantiles may be used to determine limits where such limits may be used to find anomalies. For example, limits may be $Q1-(k*|Q3-Q1|)$ and $Q3-(k*|Q3-Q1|)$, where k is a parameter having variable value used to control limits, e.g., threshold limits, for anomaly detection. Parameter k may be any value, for example 1.5, 3.0, or any value of k>3. A value of parameter k may indicate a type of an outlier that may be identified. For example, k=1.5 may be used to identify, or flag, possible outliers, k=3.0 may be used to identify serious outliers and k>3.0 may be used to identify extreme values.

Embodiments of the invention will now be described in terms of a received signal, e.g., x(t), where t=1, 2, . . . , n. x(t) may be represented as $$x(t)=A\cos(2\pi\omega t+\phi)+e(t),$$

where:
A=amplitude, ω=frequency, φ=phase, e(t)=noise, e.g., Gaussian noise. A transform that may be frequency based, e.g., a Fourier transform or a fast Fourier transform (FFT), may be applied to signal x(t). Coefficients, e.g., Gaussian Fourier coefficients, may be determined, and may be $C_1, C_2, \ldots, C_n$. Such coefficients may be with respect to frequencies, that may be $\omega_1, \omega_2, \ldots, \omega_n$, and may also be considered to be coefficients. A periodogram may be determined from FFT coefficients, or from squares of coefficients, e.g., $C_1^2, C_2^2, \ldots, C_n^2$, and may represent a power spectrum and/or energies. Squares of coefficients may be used for a statistical analysis, e.g., a chi-square analysis, and such squares of coefficients may be statistical variables, e.g., chi-square variables. A statistical analysis may be used to determine limits, or confidence limits, for example alpha confidence limits, e.g., $100(1-\alpha)$ % limits. Such limits may be determined for an α of 0.01, 0.05, 0.10, or other values. Limits may be related to coefficients, e.g., $C^2(\omega)$. A limit, for example, for an α of 0.05 may be considered to be a $95^{th}$ percentile and may be for a particular frequency. A limit may be used to determine a threshold, $T(\omega)$, where $T(\omega)=C^2(\omega)$. A comparison may be made between squares of coefficients and a threshold, e.g., a comparison between $C_i^2$, where i=1, 2, ..., n, and $T(\omega)$. Elements of $C_i^2$ beyond a threshold, $T(\omega)$, e.g., elements>$T(\omega)$, may be considered anomalies of a signal. Computation of a threshold from determination of a limit, comparison of elements to a threshold and identification of anomalies may be performed at a plurality of frequencies, and may be performed for all frequencies.

An order of magnitude of complexity of determination of limits for detection of signal anomalies and for identification of signal anomalies as described herein may be on an order of n*Log(n) complexity. Streaming data may be analyzed by a detection and identification method described herein, and a periodogram and/or a spectrogram, e.g., as related to a short-time Fourier transform (STFT, sometimes called a "short-term Fourier transform"), may be used as well. Such a method may be used to determine limits and to identify anomalies for continuous signals, e.g., streaming data.

Reference is now made to FIG. 1, which is a flowchart illustrating operation of an exemplary method 100 for identifying anomalies of signals. A frequency-based analysis may be performed on a signal (operation 110). The frequency-based analysis may be any of a number of types of analyses, for example a Fourier transform, an FFT, an STFT, other transforms, periodograms, and spectrograms, or the like. Results of the frequency-based analysis may be in the form of coefficients, where such coefficients may have particular meanings when related to frequencies, and such coefficients may correspond to such frequencies. Resultant coefficients and frequency coefficients may be taken together as coefficients determined as a result of a frequency-based analysis (operation 120), and may be descriptive of results of such an analysis. A statistical analysis may be performed using determined coefficients (operation 130), and such analysis may be used to determine statistics of such coefficients. Limits, e.g., confidence limits, may be determined (operation 140) based on parameters of a statistical analysis. Such limits may be applied to a signal, or elements that may be correlated to a signal. Elements of a signal that may be within determined limits may be considered to be normal signal elements. Elements of a signal that may be outside determined limits may be identified as anomalies of a signal (operation 150). Besides the operations shown in FIG. 1, other operations or series of operations may be used to identify the signal anomalies.

Reference is now made to FIG. 2, which is a flowchart illustrating operation of an exemplary method 200 for identifying anomalies of signals. In operation 210, a signal may be input to a device, a system, or other unit capable of performing mathematical operations. A signal may be previously stored or may be received or available on a continuous or a real-time basis. In operation 220, a frequency-based analysis may be performed on a signal, e.g., as in operation 110 of FIG. 1. The frequency-based analysis may be any of a number of types of analyses, for example a Fourier transform, an FFT, an STFT, other transforms, periodograms, and spectrograms, or the like. Results of the frequency-based analysis may be in the form of coefficients, where such coefficients may have particular meanings when related to frequencies, and such coefficients may correspond to such frequencies.

In operation 230, resultant coefficients and frequency coefficients may be taken together as coefficients determined as a result of a frequency-based analysis, e.g., as in operation 120 of FIG. 1, and may be descriptive of results of such an analysis. Fourier coefficients may be computed for each time value, and time information may be considered to be a cost. A Gabor transform may be used, where a windowed Fourier transform within each time interval may be used to compute a power spectrum from coefficients. In operation 240, determined coefficients may be modified in a variety of ways, for example, coefficients may be squared and may produce modified coefficients. Squared coefficients, or modified coefficients, may be stored or otherwise made available for additional calculations.

In operation 250, a statistical analysis may be performed using coefficients or modified coefficients, e.g., as in operation 130 of FIG. 1, and such analysis may be used to determine statistics of such modified coefficients. A variety of statistical analyses may be used, for example, a chi-square statistical analysis may be used to analyze modified coefficients, e.g., squared coefficients. Other statistical methods may be used, for example non-parametric methods. Non-parametric methods may rely on statistics that are other than normal, or Gaussian. Quartiles, or, more broadly, quantiles, may be computed and may use modified coefficients, for example a $25^{th}$ (Q1), a $50^{th}$ (Q2) and a $75^{th}$ (Q3) quantile may be computed, and such quantiles may be computed from a distribution of variables, e.g., modified coefficients.

In operation 260, limits may be determined, e.g., as in operation 140 of FIG. 1, based on parameters of a statistical analysis, e.g., confidence limits, and may be applied to modified coefficients that may be used for such statistical analysis. Limits may also be determined from quantiles that may be computed, and may be computed by a variety of methods, e.g., Q1−(k*|Q3−Q1|) and Q3−(k*|Q3−Q1|), may determine an upper and a lower limit. Other such related determinations may also be made. Such limits may be applied to a signal, or elements that may be correlated to a signal. In operation 270, a signal may be compared to limits that may be determined from a statistical analysis, or from parameters of a statistical analysis. Values may be arranged in an order, e.g., an ascending order, when being compared to quantile limits.

In operation 280, a determination may be made as to whether elements of a signal, or a signal, may be within or outside limits. Elements of a signal that may be within determined limits may be considered to be normal signal elements, or elements that may not be further identified. In operation 290, elements of a signal that may be outside determined limits may be identified as anomalies of a signal, e.g., as in operation 150 of FIG. 1. Anomalies of a signal may be identified, e.g., flagged, in real-time, near real-time or may be otherwise stored. Other parametric or non-parametric methods may be used to detect anomalies, in accordance with a method described herein. Besides the operations shown in FIG. 2, other operations or series of operations may be used to identify the signal anomalies.

Reference is now made to FIG. 3, which is a conceptual block diagram of a device 300 for identifying anomalies of signals. A signal 310 may be input to a device, a system, processor 320 or other unit capable of performing mathematical operations. Signal 310, e.g., x(t), may be previously stored or may be received or available on a continuous or a real-time basis. Signal 310 may be input from a receiver, e.g., a wired or a wireless receiver, or from another component of a device or system. A signal that may be previously stored may be input from a memory 350 or any other memory that may be operatively connected to device 300.

Processor 320 may be any processor capable of performing mathematical operations, and may be capable of executing a program as, for example a software readable device. Processor 320 may be a general purpose processor or a specialized processor, and may contain or be operatively connected to sub-processors or co-processors. Processor 320 may comprise an analyzer 330, a calculator 340 and a comparator 360. Each of analyzer 330, calculator 340 and/or comparator 360 may be functional components or conceptual elements of processor 320, and each may be within processor 320 or operatively connected to processor 320. Analyzer 330 may perform a frequency-based analysis on signal 310 and then may analyze results of this frequency analysis by a statistical analysis. Results of a frequency analysis and/or a statistical analysis from analyzer 330 may be stored in memory 350. Calculator 340 may calculate one or more limits, or thresholds, based on results of a statistical analysis from analyzer 330. Thresholds that may be calculated by calculator 340 may be stored in memory 350. Comparator 360 may compare limits calculated by calculator 340 to signal 310, or elements of signal 310. Processor 320 may determine whether a signal 310, or elements of signal 310, contains anomalies, or signal anomalies, based on a comparison made by comparator 360, and may provide an output 370. Output 370 may be an identification of anomalies, signal anomalies, or other outputs that may be related. Signal anomalies and/or signal elements exclusive of anomalies may be stored in memory 350.

A memory 350 may be present in some embodiments of the invention. Memory 350 may be located within processor 320, however memory 350 may be external to processor 320, and may be operatively connected to processor 320. Memory 350 may be any type of memory, e.g., cache, static, volatile, non-volatile or any other type. Memory 350 may also be used to store a signal, elements of a signal, or anomalies of a signal. Memory 350 may consist of one or more memories.

A frequency-based analysis as described herein may use a Fourier transform, e.g., a discrete Fourier transform (DFT). A set of numbers, $x_1, x_2, \ldots, x_N$ may be generated, e.g., according to a Gaussian distribution or law, $x=\{x_i\}_{i-1}^N$. A DFT may be $$X(\omega_j) = \sum_{t=1}^{N} x_t e^{-2\pi i \omega_j t},$$

where $$\omega_j = \frac{j}{N}$$

and $j \in \{1, 2, \ldots, N-1\}$. An inverse Fourier transform may be $$x(t) = \frac{1}{N} \sum_{j=1}^{N-1} X(\omega_j) e^{2\pi i \omega_j t},$$

where $t=1, 2, \ldots, N$. A DFT, as above, may be an inner product of data $\{x_i\}$, and a basis function may be $\phi=\{e^{2\pi i \omega_j}\}$, and may be a constant. For example, $$X(\omega_j) = \langle x, \phi \rangle$$

$$x(t) = \langle X(\omega_j), \phi \rangle, j \in \{0, 1, \ldots, N-1\}.$$

In a DFT, as above, $X(\omega_j)$ may be a linear combination of a finite number of $x_t$, where $t=1, 2, \ldots, N$, and $x_t$ may be the same values as $x_i$. Such values may be Gaussian in nature, and as such $X(\omega_j)$ may be Gaussian. A set of basis functions may include time and frequency atoms, and may introduce redundancy. Basis functions may be used to compute Fourier coefficients.

A Power Spectral Density (PSD) may be a measure of energy, for example in a dataset. Energy may be an amplitude of a dataset at, for example, a particular frequency. PSD may be expressed as:

$$P[X(\omega)] = \{|X(\omega)|\}^2$$

A sample may be of a size N, and may be a sample of observations, represented as $\{x_i\}_{i-1}^N$. A PSD may be $$P(x_j) = PSD(X(\omega_j)) = \frac{1}{N} \left| \sum_{t=1}^{N} x_t e^{-2\pi i \omega_j t} \right|^2.$$

For each $\omega_j$, $P(x_j)$ may be a sum of squares of Gaussian variates. The coefficients $X(\omega_j)$ may be transformed to standard Gaussian variates, $$ZX(\omega_j) = \frac{(X(\omega_j) - MX(\omega_j))}{SX(\omega_j)},$$

where $MX(\omega_j)$, $SX(\omega_j)$ are a mean and standard deviation ($\sigma$) of $X(\omega_j)$, and $X(\omega_j)$ may follow a normal distribution, e.g., $N(0,1)$ zero mean and $\sigma=1$. For a sample size of N, j may have values $j=1, 2, \ldots, N-1$, and may be a square $X^2(\omega_j)$, which may be a set of chi-square random variables.

Confidence intervals may be determined, as above and herein. Such a limit may be a threshold, and may be used to determine outliers, or anomalies, of a set of data, a sample set of data or of a signal. Elements of a signal, or a signal, that may be compared to such thresholds, or limits, may be distinguished as within a limit or outside a limit. Elements of a signal that may be found to be outside such limits may be identified as a signal anomaly, or an anomaly.

A frequency-based analysis as described herein may use a Fourier transform, e.g., a short-time Fourier transform (STFT). Data $x_t$ may be representative of a signal, where $t=1, 2, \ldots, N$. An STFT of a signal, $x_t$, may be $$STFT_x^W(\omega, \Gamma) = \int_{-\infty}^{\infty} x(t) W(t - \Gamma) e^{-2\pi i \omega t} dt,$$

where W describes a window, w is a frequency, $\Gamma$ is a point in a time domain representation of a window, and $\Gamma$ may be at a center of a window. A window may be a time window and may delineate a portion of a signal, and a signal may be described by a time domain representation for a purpose of identifying a window.

Figure 4:
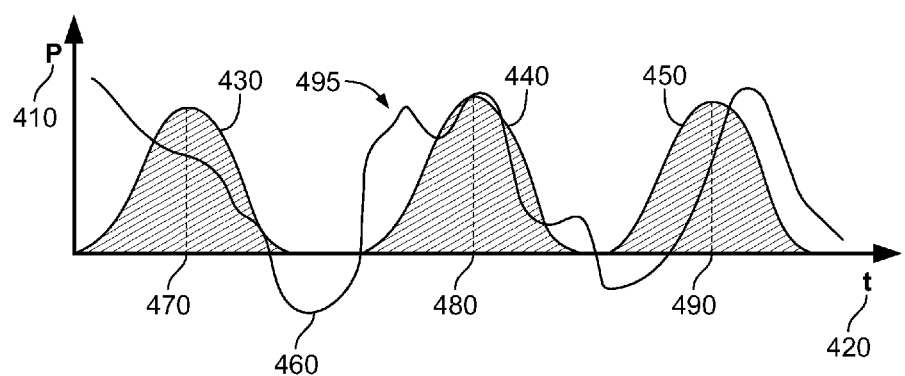
FIG. 4 is a conceptual illustration of a signal having anomalies according to embodiments of the invention.

An STFT may be applied to a signal as, for example, a frequency-based analysis, and a signal may be $x_t$, where $t=1, 2, \ldots, N$. Reference may be made to FIG. 4, which is a conceptual illustration of an exemplary signal 460 according to embodiments of the invention. Power or amplitude 410 is plotted versus time 420 for a time-domain representation of exemplary signal 460. Other representations are possible. One or more windows $W(t-\Gamma)$ 430, 440, 450 may be identified, and windows may be periodic in occurrence, or may occur at intervals. Centers, $\Gamma$, 470, 480, 490 of windows 430, 440, 450, respectively may be identified. Each window center may correspond to an index, e.g., a first window center 470 may correspond to $\Gamma_1$, a second window center 480 may correspond to $\Gamma_2$, and a third window center 490 may correspond to $\Gamma_3$. It may be desirable to capture an anomaly at a particular time, as described herein. Windows may be used to detect a signal anomaly 495 as described herein, where such detection may be completed automatically.

An STFT may be a DFT with windows, where a DFT may be multiplied by a window, W. An STFT may aid in an analysis of a signal over a shorter segment of a signal, and may enable a local analysis. It may provide an ability to analyze signals over, for example, a time-frequency axis. A discrete STFT may be $$S_f[\Gamma, \omega] = \sum_{t=0}^{N-1} x(t)W(t-\Gamma)e^{-\frac{2\pi i \omega t}{N}},$$

where $0 \leq \Gamma < N$ and $\omega \in \{0, 1, 2, \ldots, N-1\}$. A window, W, may localize a Fourier transform. An advantage of an STFT is that it may be suitable for signals, or data, that are stationary across local areas in a time domain. A signal x(t), or data, may be recovered by $$x(t) = \frac{1}{N} \sum_{\Gamma=1}^{N-1} W(t-\Gamma) \sum_{\omega=1}^{N-1} S_f[\Gamma, \omega] e^{\frac{2\pi i \omega n}{N}}.$$

An STFT may be computed over each segment, and over each segment a power spectrum may be calculated. Window-specific chi-square, $\chi^2$, percentiles, e.g., 99%, 95%, 90%, may be computed, and may establish limits, or thresholds, as described herein.

A window size may be fixed, and a fixed window size may develop a threshold value that may remain constant over each segment. An exemplary embodiment may be a chi-square, $\chi^2$, threshold that may be $X_{W-1,(1-\alpha)}^2$, where N is a window size and $\alpha \in \{0.01, 0.05, 0.10\}$.

A window size may be predefined, and may be derived from a sample size. A sample size may correlate to a degree of freedom of the analyses described herein, and may correlate to a size of a window. Certain transforms, e.g., a Gabor transform, may use a fixed window size. When windows may be used, a window size may be predefined. Within each window, a spectral analysis may be performed, for example an FFT, and coefficients may be determined. A linear combination of Gaussian variables may also be Gaussian in nature, and such for squares of such variables. A statistical analysis, e.g., a chi-square analysis, may be performed, a confidence intervals may be computed from such an analysis and thresholds may be determined from such confidence intervals. A comparison of thresholds to data may detect anomalies, and detection may occur in a particular window. Such a process may be repeated over all windows. A computed mean and a computed variance of a PSD may be used to establish a window. Window edge effects may be addressed by using overlapping windows, e.g., 16 or 32 observations of overlap.

An STFT may be used to detect anomalies in a joint time-frequency domain, and may be used where data may be available in real time, e.g., streaming data. A statistical analysis, e.g., a chi-square analysis, may be used to detect anomalies where such statistical analysis may be performed on results of a frequency analysis, e.g., an STFT. For example, anomaly detection over streaming data may be performed by applying a chi-square analysis to results of an STFT, where such STFT operates on streaming data.

Figure 5:
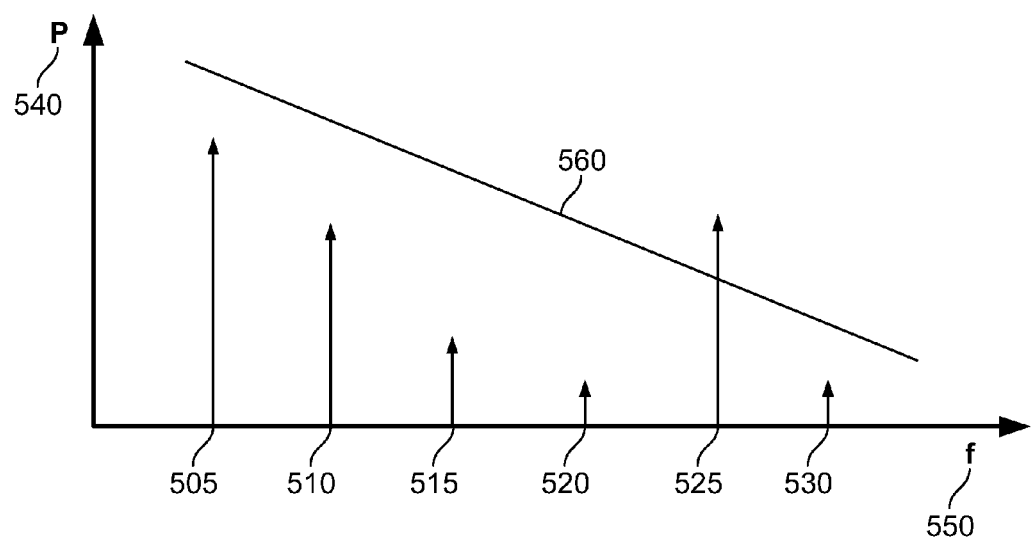
FIG. 5 is a conceptual frequency domain illustration of a signal having anomalies according to embodiments of the invention.

Reference may be made to FIG. 5, which is a conceptual frequency domain illustration of an exemplary signal according to embodiments of the invention. Power or amplitude 540 is plotted versus frequency 550 for a frequency-domain representation of an exemplary signal. Other representations are possible. An exemplary signal may be represented by frequency, or spectral, components 505, 510, 515, 520, 525, and 530, where each are spaced in frequency and may have a power, or amplitude according to results of a frequency analysis of a signal, as described above and herein, and each such spectral spacing and power may be related to one or more coefficients of a frequency analysis. A threshold 560 may be determined, as described herein, and may be used to determine whether a spectral component may be an anomaly. A threshold 560 may be a deterministic threshold or be probabilistic in nature. In a conceptual illustration of an exemplary signal a spectral component 525 may cross a threshold 560 when an input signal may be compared to a threshold 560, and may be identified as an anomaly of a signal. Even though threshold 560 is shown as a decreasing straight line, threshold 560 may have any shape—increasing slope, flat, up-and-down, etc.

Thresholds useful for detection of anomalies that may be present in a signal may be established by performing a statistical analysis on results of a frequency analysis of such a signal. Anomalies of such a signal may then be determined by comparison of a signal to these thresholds. Prior techniques may use a periodogram or a spectrogram, as well as generic anomaly detection tools, and may be based on a Gaussian distribution or a Tukey method. In all such cases only generic applications are implemented, and detection may not be automatic. Specific application of a chi-square analysis method or a quantile method to a spectral analysis implements a consistent method for determining limits for detection of anomalies during signal analyses, and provides for automatic anomaly detection.

A frequency analysis may be a Fourier transform, for example, a fast Fourier transform (FFT). A statistical analysis may be, for example, a chi-square analysis, where such a statistical analysis may be performed on parameters that may be derived from results of a frequency analysis. An embodiment may use limits, for example confidence limits, from a chi-square analysis performed using squared coefficients of an FFT analysis of a signal to determine thresholds for detection of anomalies of such signal.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

The invention claimed is:

1. A method for identifying anomalies of a signal, comprising:
    transforming a signal using a frequency-based transform to determine frequency transform coefficients;
    squaring said frequency transform coefficients to yield squared coefficients;
    ordering said squared coefficients;
    analyzing said squared coefficients using a statistical analysis technique;
    determining one or more limits based at least on said statistical analysis;
    comparing said squared coefficients as have been ordered to said limits; and
    identifying anomalies of said signal, based on elements thereof beyond said limits.

2. The method of claim 1, wherein said frequency-based transform is one or more of a Fourier transform and a fast Fourier transform.

3. The method of claim 1, wherein said frequency-based transform is a short-time Fourier transform.

4. The method of claim 3, wherein said signal is segmented into time windows.

5. The method of claim 4, wherein said short-time Fourier transform is applied within said windows.

6. The method of claim 1, wherein said statistical analysis technique is a chi-square analysis.

7. The method of claim 6, wherein said limits are set by alpha confidence intervals of said chi-square analysis.

8. The method of claim 1, wherein said statistical analysis technique is a quantile analysis.

9. The method of claim 8, wherein said limits are derived from quantiles of said quantile analysis, to yield quantile limits.

10. The method of claim 9, wherein said comparing said squared coefficients as have been ordered to said limits comprises comparing said squared coefficients to said quantile limits.

11. The method of claim 1, wherein said limits are thresholds of said signal.

12. The method of claim 1, wherein said frequency-based analysis technique and said statistical analysis technique analyze streaming data in real-time.

13. The method of claim 1, wherein ordering said squared coefficients comprises ordering said squared coefficients in ascending order.

14. A method for identifying anomalies of a signal, comprising:
transforming a signal using a short-time Fourier transform to determine Fourier coefficients;
squaring each Fourier coefficient;
analyzing said squared coefficients using a statistical analysis technique;
determining one or more limits based at least on said statistical analysis;
comparing said squared coefficients to said limits;
determining elements of said signal beyond said limits; and
identifying anomalies of said signal, based at least on correspondence to said elements,
wherein said statistical analysis technique is a quantile analysis and said determining of one or more said limits further comprises calculating said one or more limits based at least on results of said quantile analysis,
and wherein said comparison of said Fourier coefficients to said limits further comprises ordering said modified coefficients in ascending order for comparison to said quantile limits.

15. The method of claim 14, wherein a technique for performing said statistical analysis is a chi-square analysis.

16. The method of claim 15, wherein said determining of said limits comprises calculating said limits from alpha confidence intervals of said chi-square analysis, wherein said alpha confidence intervals are predetermined.

17. An apparatus for automatically identifying anomalies of a signal, comprising:
a processor for transforming a signal using a Fourier transform to determine Fourier coefficients, analyzing squares of said Fourier coefficients using a statistical analysis technique, determining one or more limits based on said statistical analysis technique, ordering said squares, comparing said squares as have been ordered to said limits, and identifying anomalies of said signal based on elements thereof beyond said limits.

18. The apparatus of claim 17, wherein ordering said squares comprises ordering said squares in ascending order.

19. The apparatus of claim 17, wherein said statistical analysis technique is quantile analysis, and said determining one or more limits comprises calculating said limits based at least on said quantile analysis, to yield quantile limits.

20. The apparatus of claim 19, wherein said comparing said squares as have been ordered to said limits comprises comparing said squares to said quantile limits.

* * * * *